(12) United States Patent
Chopra et al.

(10) Patent No.: US 11,061,732 B2
(45) Date of Patent: Jul. 13, 2021

(54) SYSTEM AND METHOD FOR SCALABLE BACKUP SERVICES

(71) Applicant: EMC IP Holding Company LLC, Hopkinton, MA (US)

(72) Inventors: Shelesh Chopra, Bangalore (IN); Sunil Yadav, Bangalore (IN); Amit Jain, Bangalore (IN); Manish Sharma, Bangalore (IN); Aaditya Rakesh Bansal, Bangalore (IN); Sneha Yadav, Bangalore (IN); Jayashree B. Radha, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 16/412,400

(22) Filed: May 14, 2019

(65) Prior Publication Data
US 2020/0364071 A1 Nov. 19, 2020

(51) Int. Cl.
*G06F 9/50* (2006.01)
*G06F 9/455* (2018.01)
(Continued)

(52) U.S. Cl.
CPC .......... *G06F 9/505* (2013.01); *G06F 9/45558* (2013.01); *G06F 11/1448* (2013.01);
(Continued)

(58) Field of Classification Search
CPC ............. G06F 11/1448; G06F 11/3072; G06F 2009/45562; G06F 2009/45587; G06F 9/45558; G06F 9/505
See application file for complete search history.

(56) References Cited

U.S. PATENT DOCUMENTS 7,395,244 B1 7/2008 Kingsford
8,479,297 B1 7/2013 Edukulla et al.
(Continued)

OTHER PUBLICATIONS

Extended European Search Report issued in corresponding European Application No. 20166272.3, dated Sep. 28, 2020.
(Continued)

*Primary Examiner* — Jacob D Dascomb
(74) *Attorney, Agent, or Firm* — Chamberlain, Hrdlicka, White, Williams & Aughtry

(57) ABSTRACT

A remote agent, for providing data protection services to virtual machines, includes persistent storage and a backup manager. The persistent storage is for storing a resource allocation calendar and lifecycle policies associated with the virtual machines. The backup manager obtains a virtual machine data package from a virtual machine of the virtual machines; identifies a computational load change point based on the lifecycle policies; predicts a magnitude of a computational load during a period of time demarcated by the computational load change point using, at least in part, the virtual machine data package; updates the resource allocation calendar to obtain an updated resource allocation calendar, the updating is based on: the identified computational load change point, and the magnitude of the computational load during the period of time; and generates a backup for the virtual machine using the updated resource allocation calendar.

20 Claims, 17 Drawing Sheets

(51) Int. Cl.
*G06F 11/30* (2006.01)
*G06F 11/14* (2006.01)

(52) U.S. Cl.
CPC ............... *G06F 11/3072* (2013.01); *G06F 2009/45562* (2013.01); *G06F 2009/45587* (2013.01)

(56) References Cited

U.S. PATENT DOCUMENTS

| | | |
|---|---|---|
| 8,510,271 B1 | 8/2013 | Tsaur et al. |
| 8,554,918 B1 | 10/2013 | Douglis |
| 8,849,947 B1 | 9/2014 | Artzi et al. |
| 9,037,547 B1 | 5/2015 | Shivdeo |
| 9,092,248 B1 | 7/2015 | Makin et al. |
| 9,256,725 B2 | 2/2016 | Oprea et al. |
| 9,311,375 B1 | 4/2016 | Naik |
| 9,632,875 B2 | 4/2017 | Raichstein et al. |
| 9,646,256 B2 * | 5/2017 | Chamness ............... G06N 5/048 |
| 9,658,925 B1 | 5/2017 | Damodharan et al. |
| 9,678,965 B1 | 6/2017 | Wartnick et al. |
| 9,740,577 B1 | 8/2017 | Chakraborty et al. |
| 9,805,075 B1 * | 10/2017 | Bachu ................... G06F 9/4843 |
| 9,977,704 B1 | 5/2018 | Chopra et al. |
| 10,061,657 B1 | 8/2018 | Chopra et al. |
| 10,146,636 B1 | 12/2018 | Ghare et al. |
| 10,216,583 B1 | 2/2019 | Krinke |
| 10,339,012 B2 | 7/2019 | Hegdal |
| 10,353,619 B1 | 7/2019 | Jha |
| 2004/0098423 A1 | 5/2004 | Chigusa |
| 2007/0239755 A1 | 10/2007 | Mahoney |
| 2008/0244601 A1 | 10/2008 | Zeis |
| 2009/0320029 A1 | 12/2009 | Kottomtharayil |
| 2010/0122248 A1 | 5/2010 | Robinson et al. |
| 2010/0257523 A1 | 10/2010 | Frank |
| 2011/0271150 A1 | 11/2011 | Bourne et al. |
| 2012/0078846 A1 | 3/2012 | Gold et al. |
| 2012/0150996 A1 | 6/2012 | Dubois et al. |
| 2014/0059209 A1 | 2/2014 | Alnoor |
| 2014/0095817 A1 | 4/2014 | Hsu et al. |
| 2015/0154039 A1 | 6/2015 | Zada et al. |
| 2015/0234713 A1 | 8/2015 | Shimada |
| 2016/0048408 A1 | 2/2016 | Madhu et al. |
| 2016/0232061 A1 | 8/2016 | Gaschler et al. |
| 2016/0371153 A1 | 12/2016 | Dornemann |
| 2017/0277597 A1 | 9/2017 | Dillon et al. |
| 2018/0032409 A1 | 2/2018 | Surakanti et al. |
| 2018/0039418 A1 | 2/2018 | Allen et al. |
| 2018/0067819 A1 * | 3/2018 | Kotha ................ G06F 11/1461 |
| 2018/0143990 A1 | 5/2018 | Figueroa et al. |
| 2018/0225311 A1 | 8/2018 | Bandopadhyay et al. |
| 2018/0314600 A1 | 11/2018 | Mori |
| 2019/0095452 A1 * | 3/2019 | Whitmer ............... G06F 16/125 |
| 2019/0129711 A1 | 5/2019 | Stopa et al. |
| 2019/0286530 A1 | 9/2019 | Talley et al. |
| 2020/0007620 A1 | 1/2020 | Das et al. |
| 2020/0110638 A1 | 4/2020 | Asthana et al. |
| 2020/0183652 A1 | 6/2020 | Krebs et al. |
| 2020/0286103 A1 | 9/2020 | Sullivan |
| 2020/0288206 A1 | 9/2020 | Bist et al. |
| 2020/0341851 A1 | 10/2020 | Rana |
| 2021/0004400 A1 | 1/2021 | Elkaim et al. |

OTHER PUBLICATIONS

Extended European Search Report issued in corresponding European Application No. 20168729.0, dated Sep. 8, 2020.
Extended European Search Report issued in corresponding European Application No. 20169836.2, dated Sep. 8, 2020.

* cited by examiner

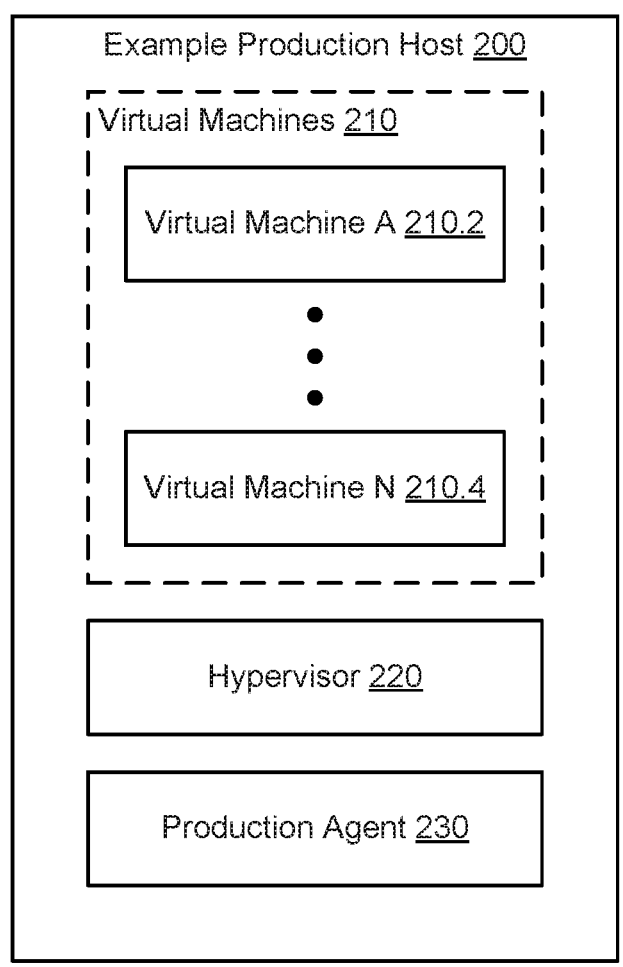
FIG. 2.1

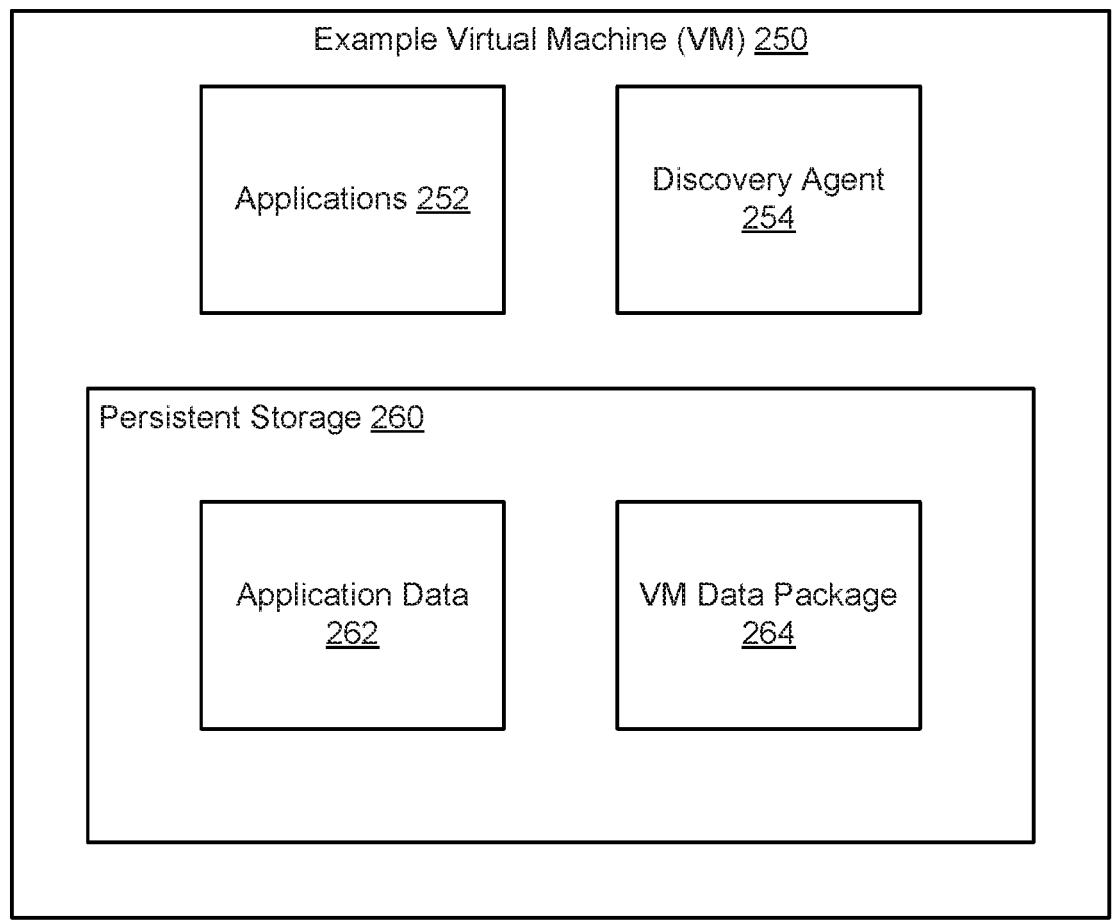
FIG. 2.2

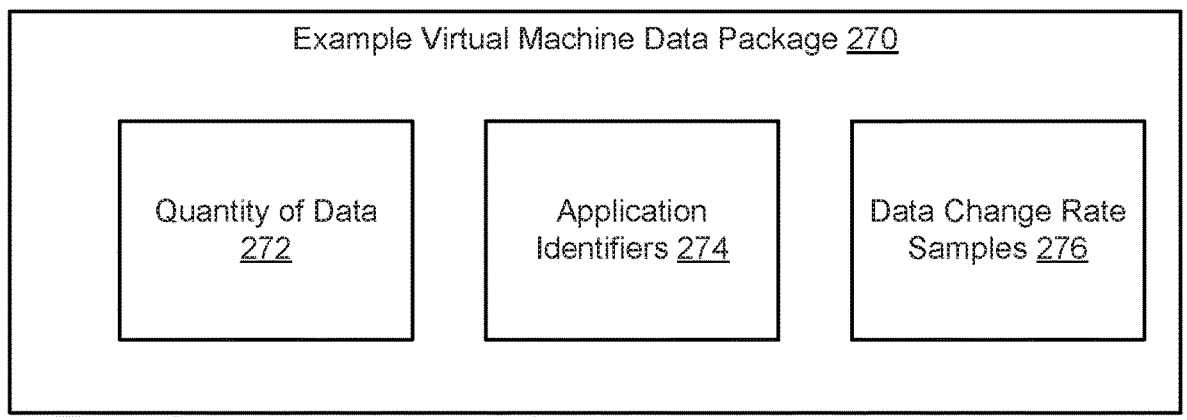
FIG. 2.3

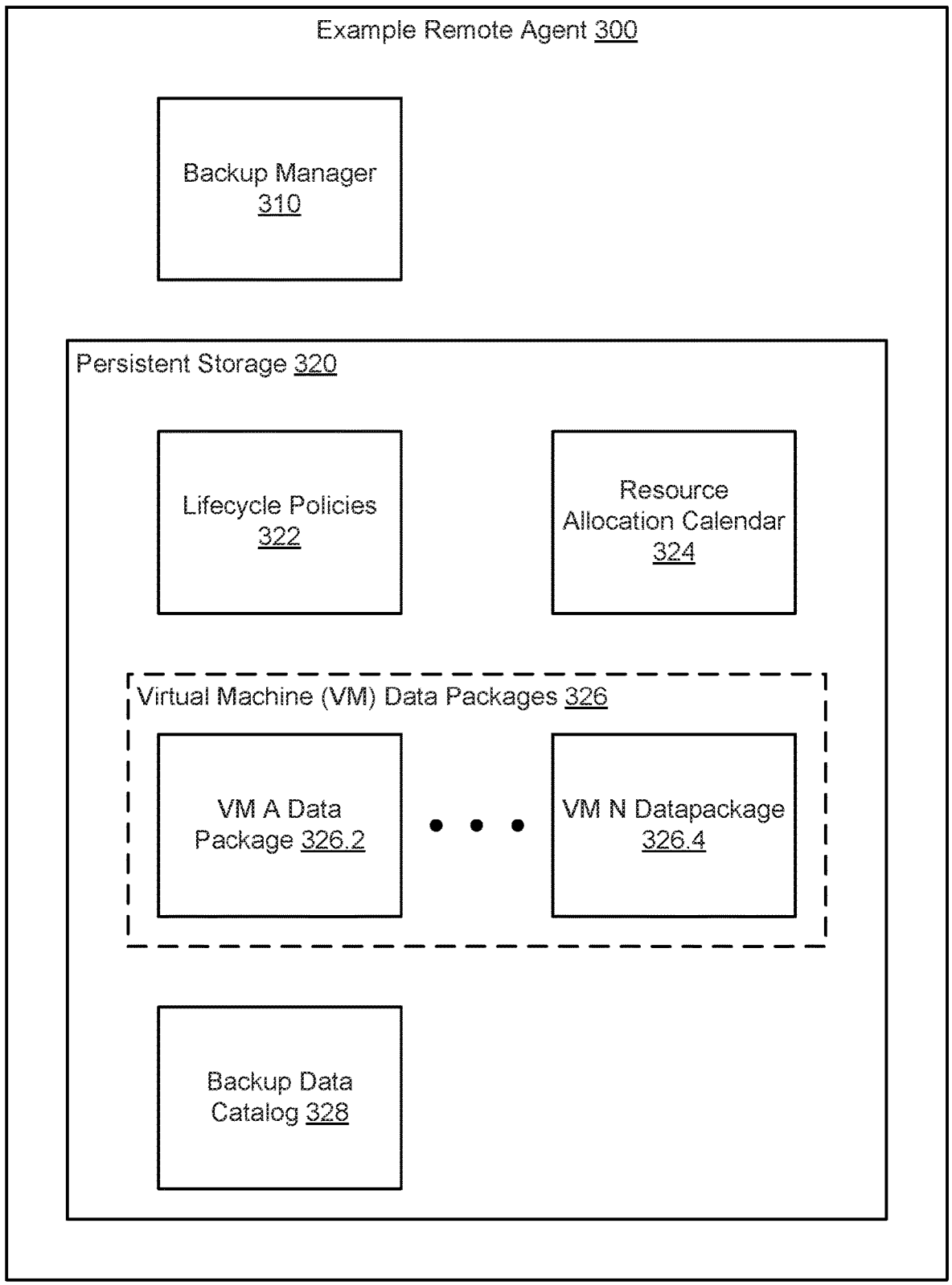
FIG. 3.1

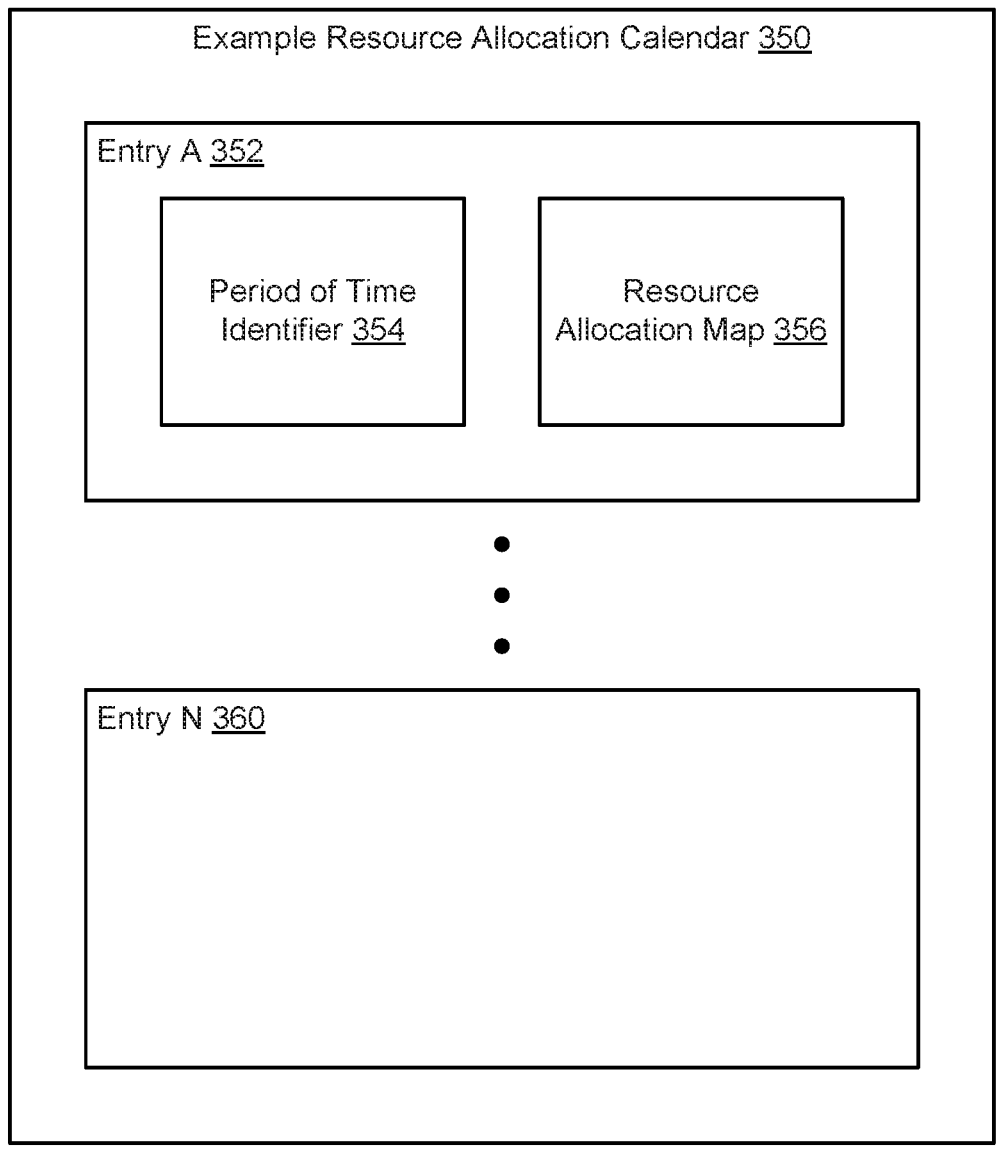
FIG. 3.2

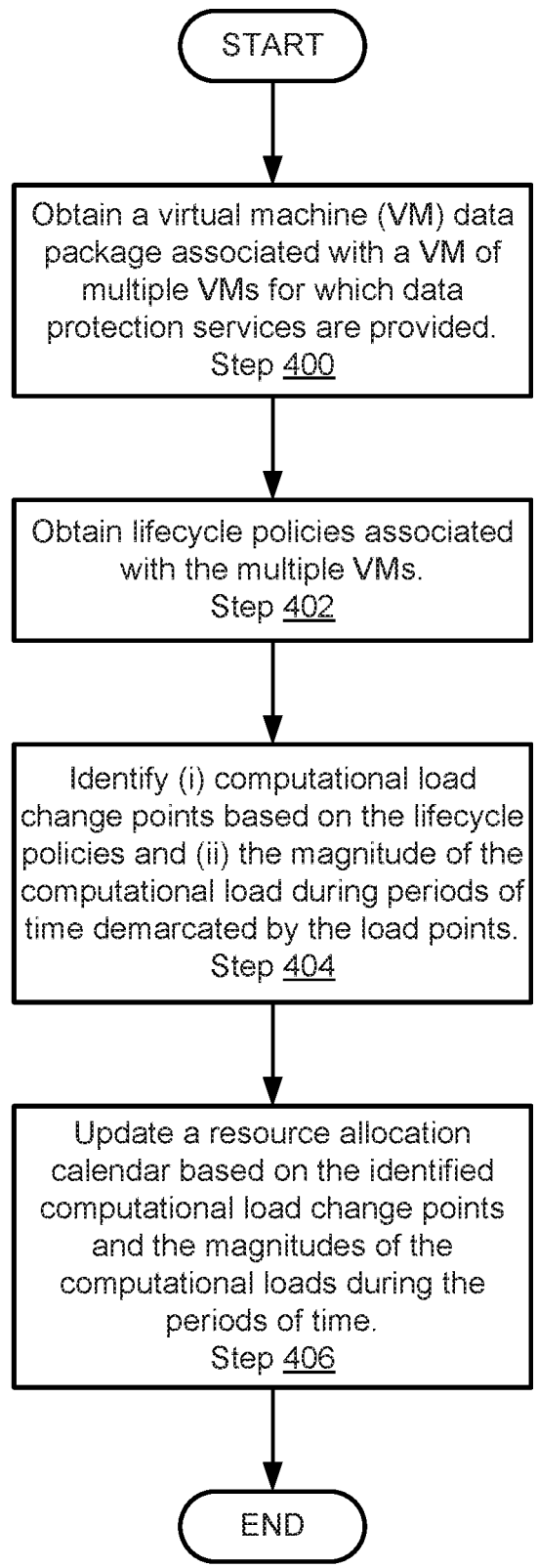
FIG. 4.1

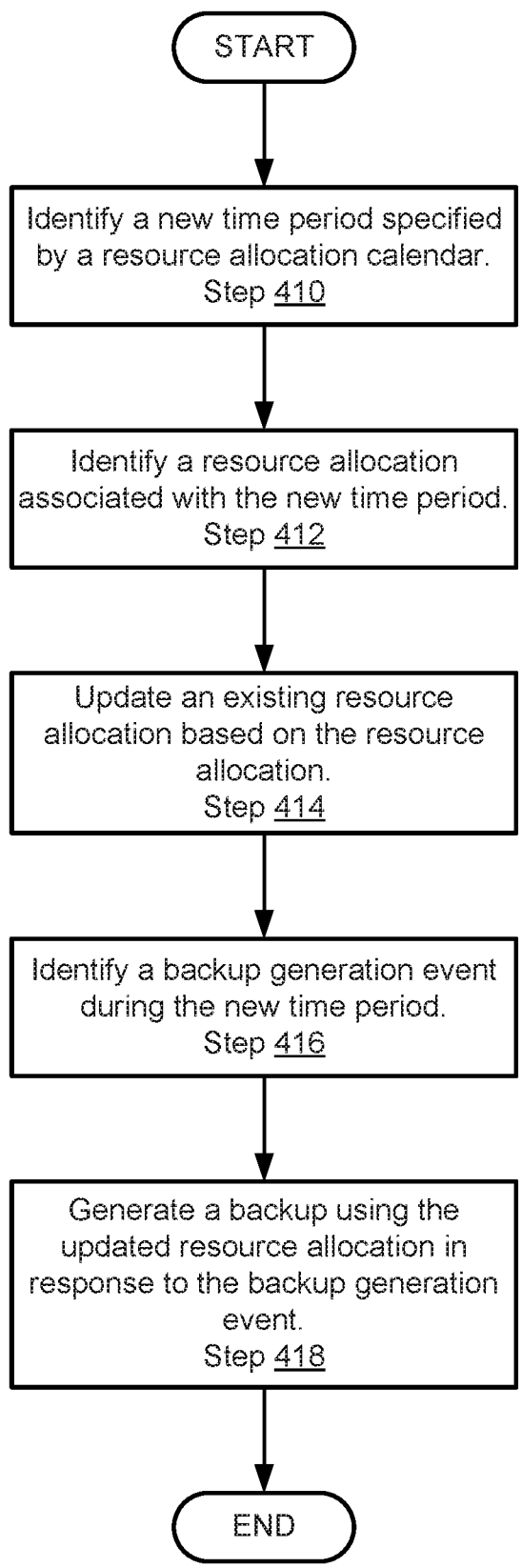
FIG. 4.2

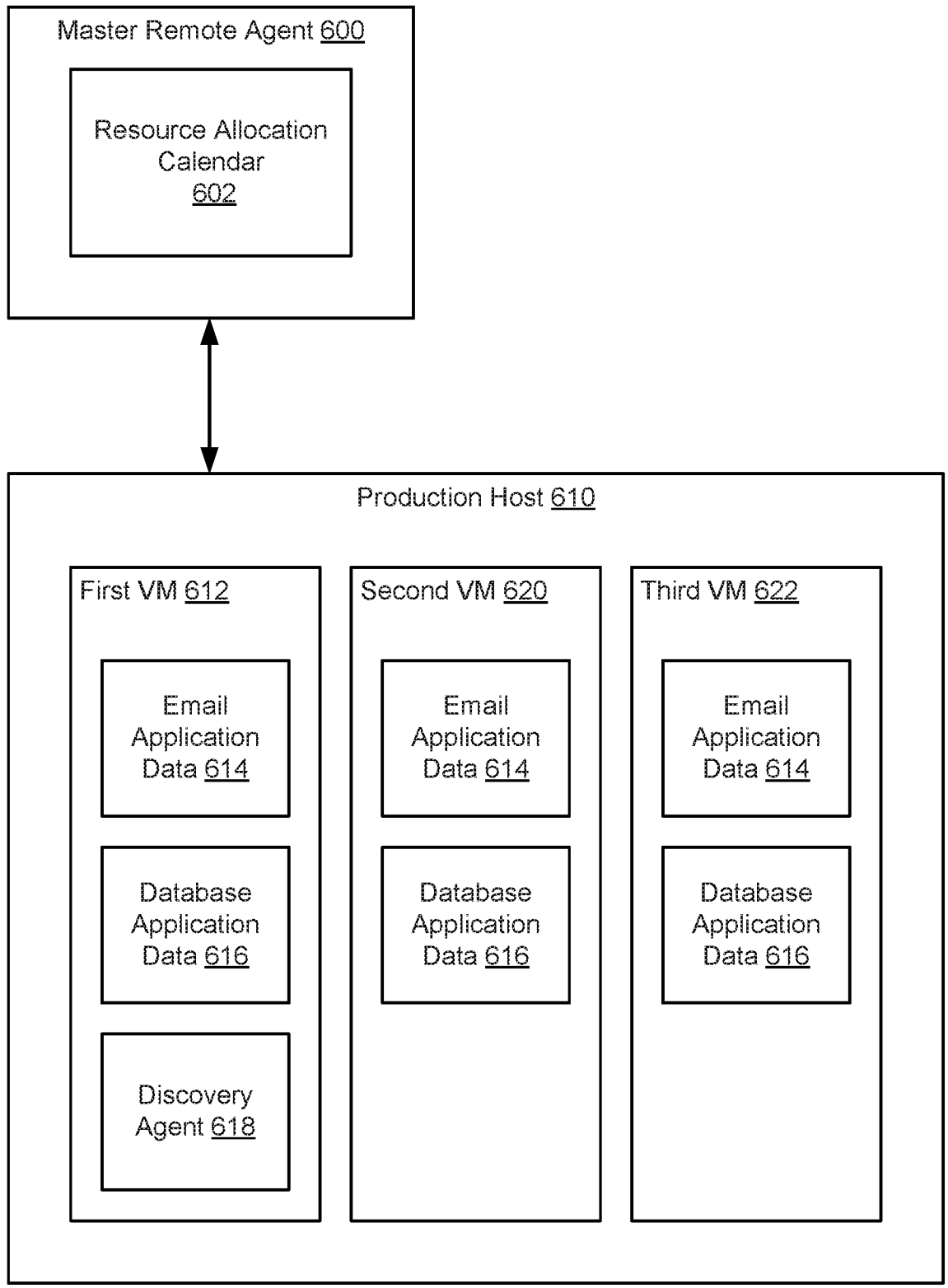
FIG. 6.1

Resource Allocation Calendar:

10:00 AM to 12:00 PM – 2 Dynamic Remote Agents
12:00 PM to 11:00 PM – 0 Dynamic Remote Agents
11:00 PM to 12:00 AM – 3 Dynamic Remote Agents
12:00 AM to 10:00 AM – 0 Dynamic Remote Agents

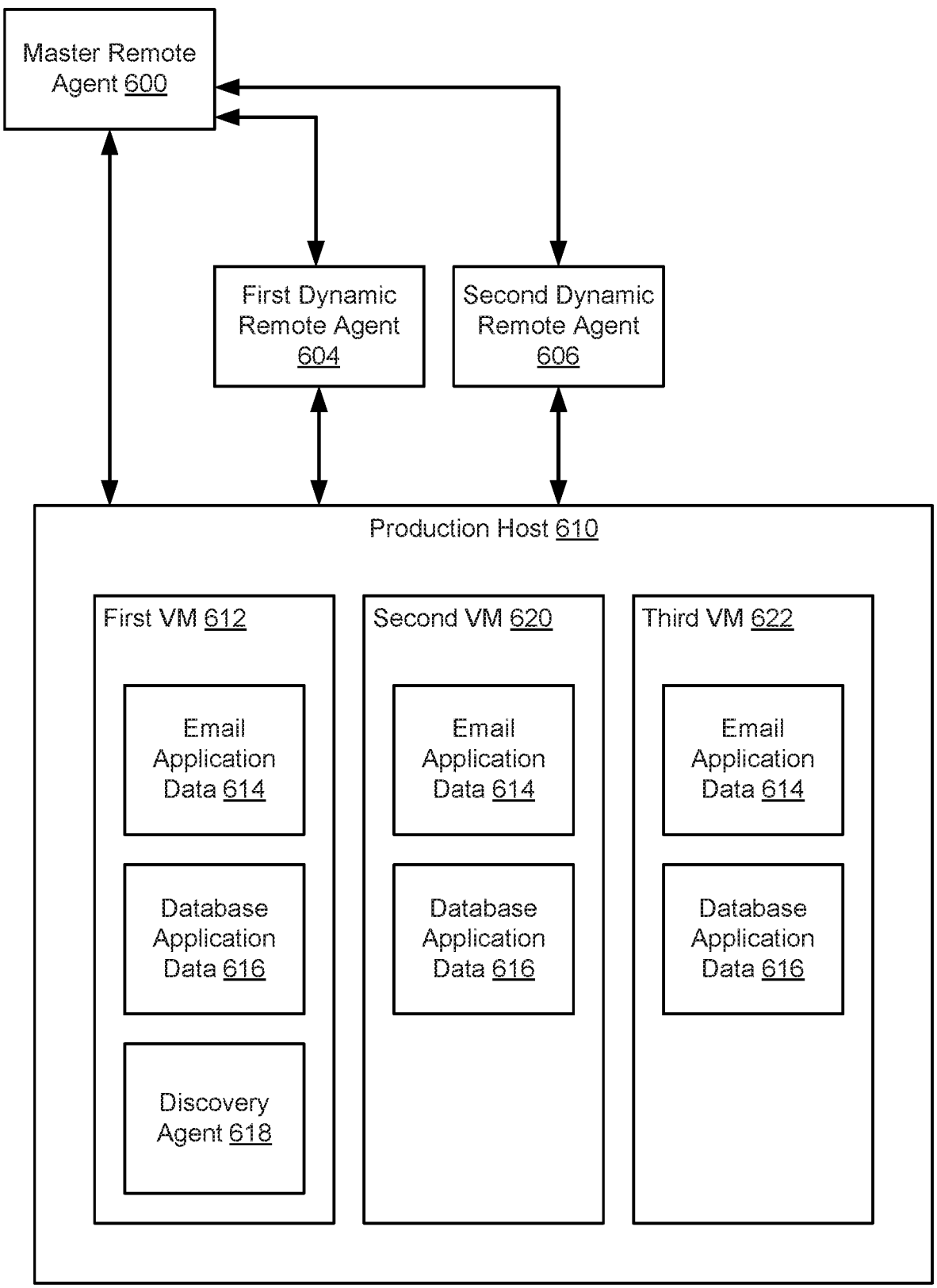
FIG. 6.3

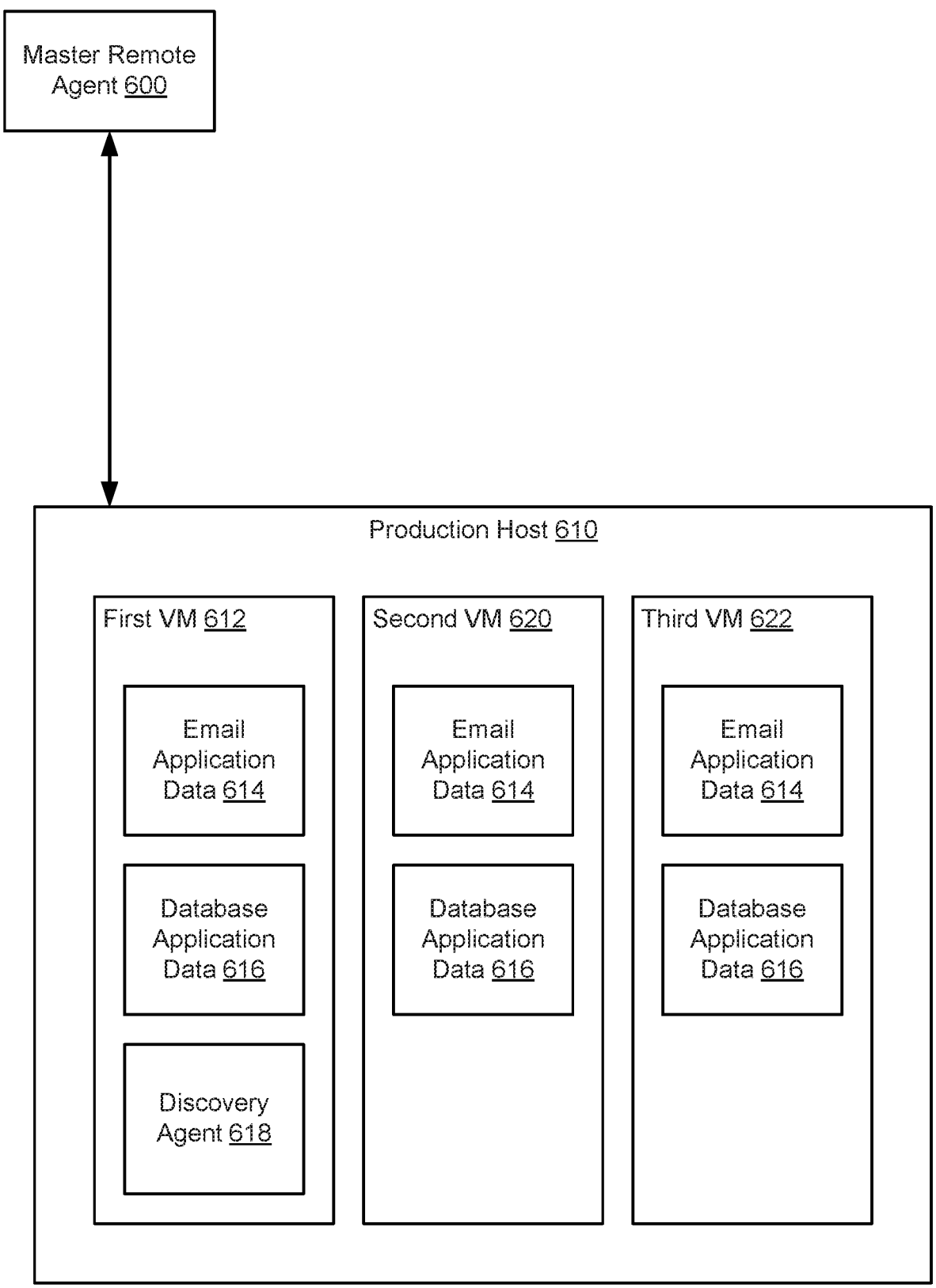
FIG. 6.4

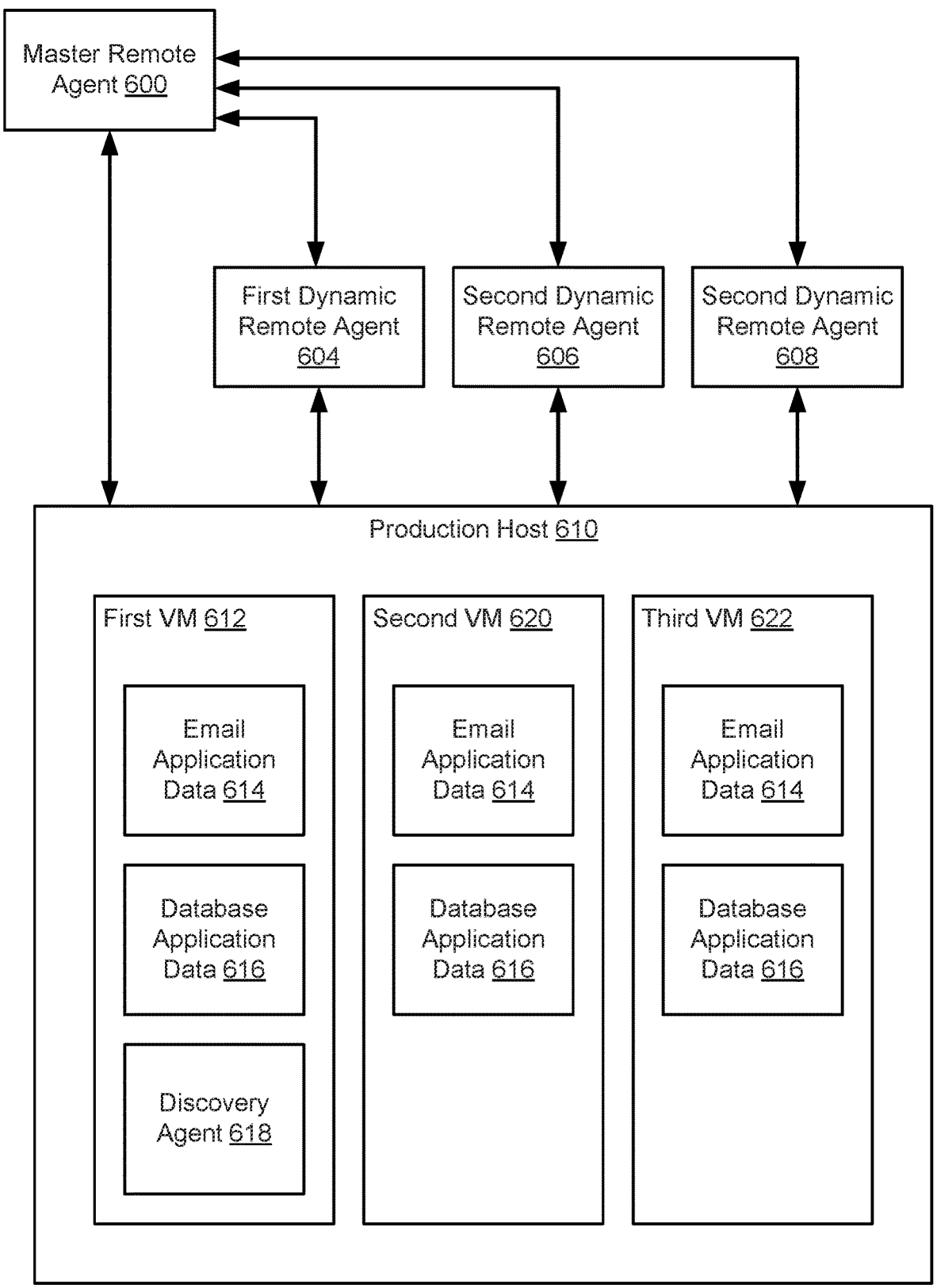
FIG. 6.5

Resource Allocation Calendar:

10:00 AM to 12:00 PM – 2 Dynamic Remote Agents
12:00 PM to 11:00 PM – 1 Dynamic Remote Agent
11:00 PM to 12:00 AM – 3 Dynamic Remote Agents
12:00 AM to 10:00 AM – 0 Dynamic Remote Agents

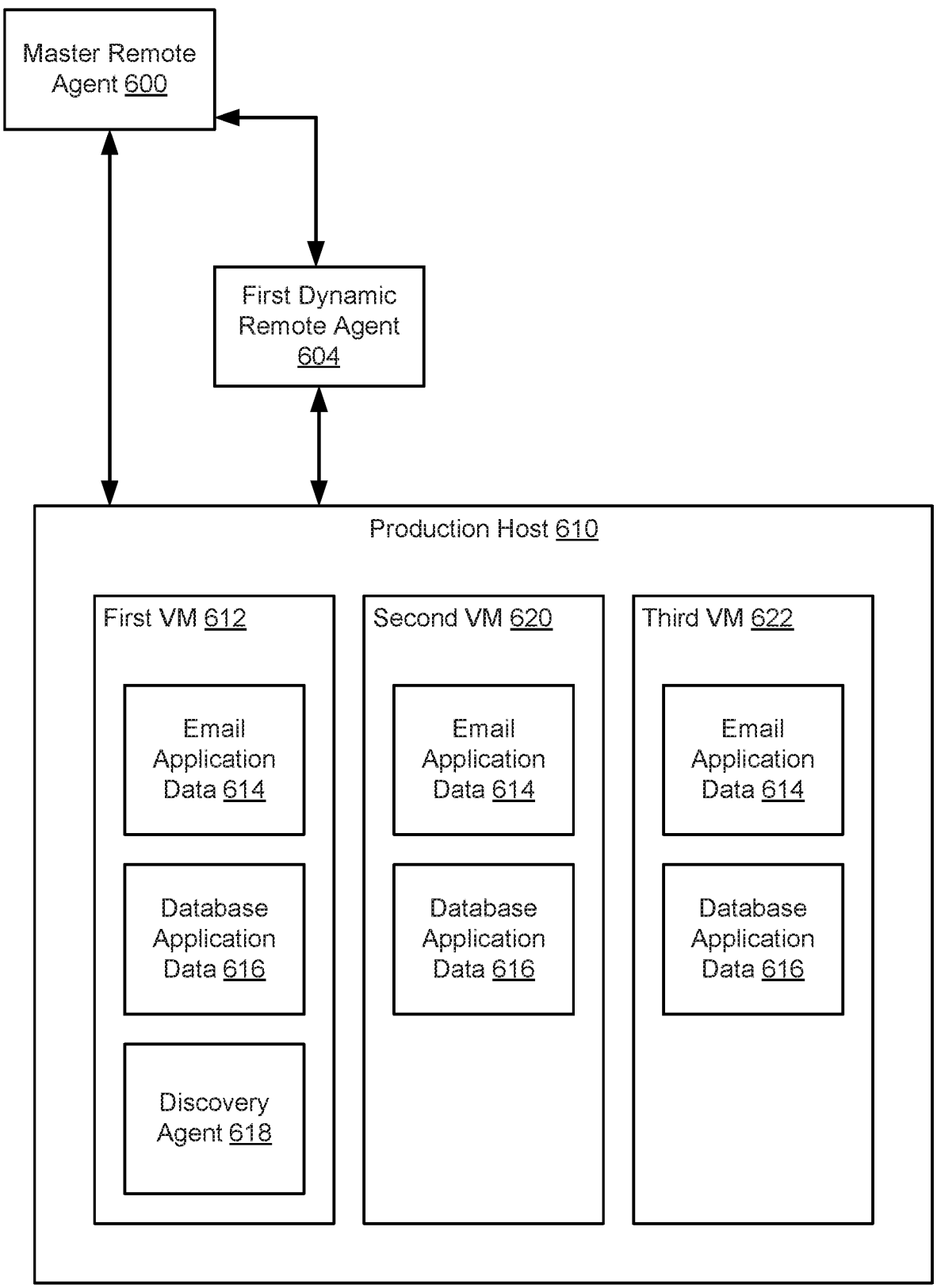
FIG. 6.7

SYSTEM AND METHOD FOR SCALABLE BACKUP SERVICES

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

Overtime, computing devices may generate data at different rates. For example, storage of data in a database may be driven by users of the database. When users of the database are, for example, sleeping the data generation rate associated with the database may be low. In contrast, the data generation rate associated with the database may be high when users of the database initially start their work day.

SUMMARY

In one aspect, a remote agent for providing data protection services to virtual machines in accordance with one or more embodiments of the invention includes persistent storage and a backup manager. The persistent storage is for storing a resource allocation calendar and lifecycle policies associated with the virtual machines. The backup manager obtains a virtual machine data package from a virtual machine of the virtual machines; identifies a computational load change point based on the lifecycle policies; predicts a magnitude of a computational load during a period of time demarcated by the computational load change point using, at least in part, the virtual machine data package; updates the resource allocation calendar to obtain an updated resource allocation calendar, the updating is based on: the identified computational load change point, and the magnitude of the computational load during the period of time; and generates a backup for the virtual machine using the updated resource allocation calendar.

In one aspect, a method for a remote agent to provide data protection services to virtual machines in accordance with one or more embodiments of the invention includes obtaining a virtual machine data package from a virtual machine of the virtual machines; identifying a computational load change point based on lifecycle policies associated with the virtual machines; predicting a magnitude of a computational load during a period of time demarcated by the computational load change point using, at least in part, the virtual machine data package; updating a resource allocation calendar to obtain an updated resource allocation calendar, the updating is based on: the identified computational load change point, and the magnitude of the computational load during the period of time; and generating a backup for the virtual machine using the updated resource allocation calendar.

In one aspect, a non-transitory computer readable medium in accordance with one or more embodiments of the invention includes computer readable program code, which when executed by a computer processor enables the computer processor to perform a method for method for a remote agent to provide data protection services to virtual machines. The method includes obtaining a virtual machine data package from a virtual machine of the virtual machines; identifying a computational load change point based on lifecycle policies associated with the virtual machines; predicting a magnitude of a computational load during a period of time demarcated by the computational load change point using, at least in part, the virtual machine data package; updating a resource allocation calendar to obtain an updated resource allocation calendar, the updating is based on: the identified computational load change point, and the magnitude of the computational load during the period of time; and generating a backup for the virtual machine using the updated resource allocation calendar.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIG. 2.3 shows a diagram of an example virtual machine data package in accordance with one or more embodiments of the invention.

FIG. 3.1 shows a diagram of an example remote agent in accordance with one or more embodiments of the invention.

FIG. 3.2 shows a diagram of an example resource allocation calendar in accordance with one or more embodiments of the invention.

FIG. 4.1 shows a flowchart of a method of updating a resource allocation calendar in accordance with one or more embodiments of the invention.

FIG. 4.2 shows a flowchart of a method of generating a backup in accordance with one or more embodiments of the invention.

FIGS. 6.1-6.7 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that dynamically instantiates and terminates remote agents that provide data protection services to the distributed system. Such instantiations and terminations may serve to redistribute computing resources within the distributed system between providing services to clients of the distributed system and providing internal data protection services.

In one or more embodiments of the invention, the instantiations and terminations are performed based on predicted workloads that will be caused by providing data protection services in the future. The predictions may be made by obtaining information regarding assets of entities that provide the services to the clients. The information regarding the assets may include the types of the assets, the applications associated with the assets, and/or the change rate of data of the assets. Such information regarding the assets of the entities may be obtained using computing resources of the entities. By doing so, the workload for managing instantiation and termination of remote agents may be distributed across the distributed system enabling the computational footprint of the remote agents to be reduced. Consequently, computing resources of the distributed system may be dynamically allocated towards the entities that provide services to the clients.

Figure 1:
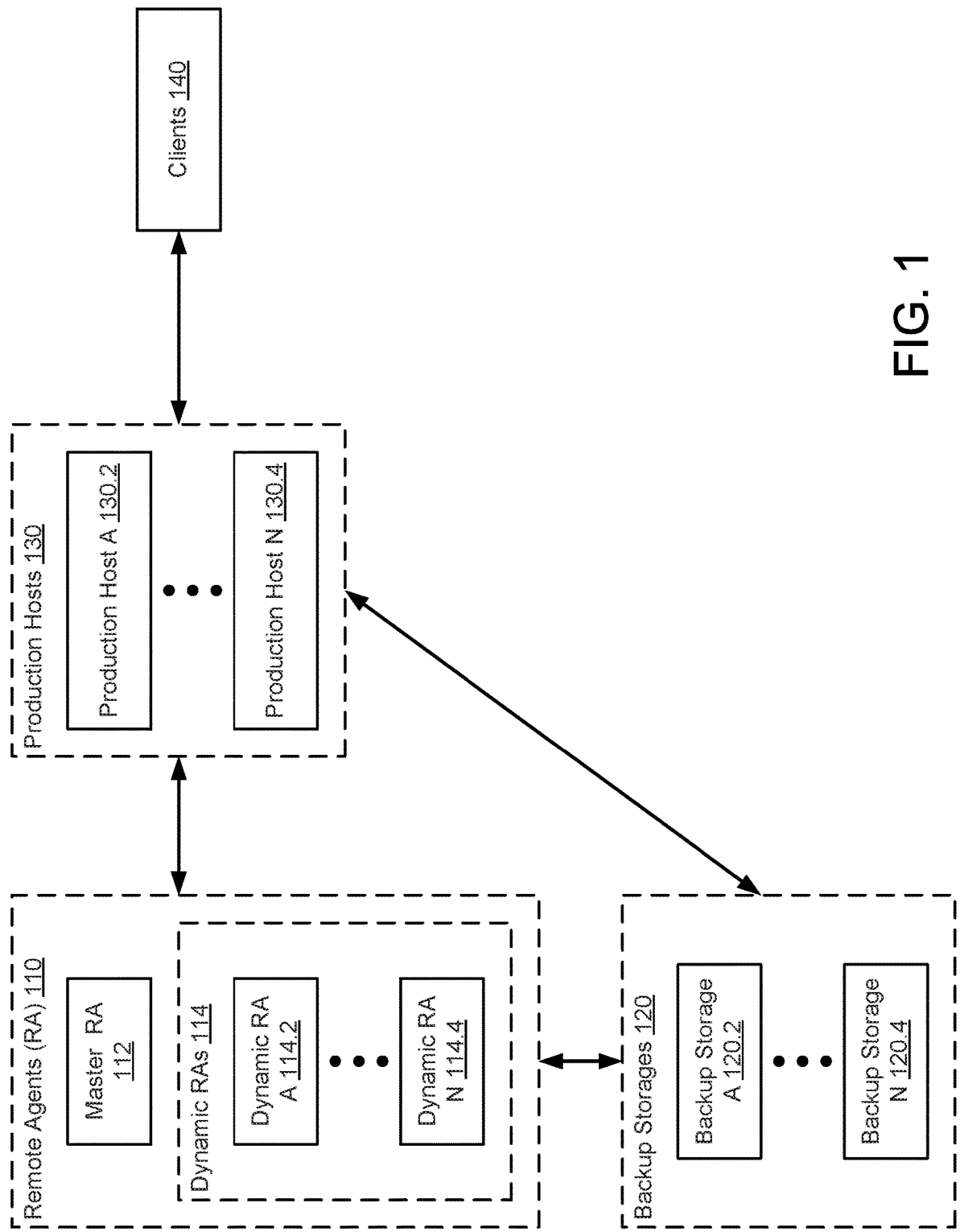
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include generation and storage of backups in the backup storages based on the protection strategies.

In one or more embodiments of the invention, the remote agents (110) are resource lite entities. That is, the remote agents (110) may be designed to minimize their computing resource consumption footprint. To provide their functionality while minimizing their computing resource footprint, the remote agents (110) may dynamically scale their computing resource consumption.

For example, a master remote agent (112) may instantiate and/or terminate dynamic remote agents (114) to modify the computing resource consumption rate of the remote agents (110). Thus, at any point in time, there may be any number of dynamic remote agents (e.g., 114.2, 114.4) and the number of such agents may change over time.

To improve the likelihood that the remote agents (110) have sufficient computing resources available to provide backup services to the production hosts (130), the remote agents (110) may predict the likely backup load that will be placed on the remote agents (110) by the production hosts (130). The predictions may be based on data obtained from the production hosts. By doing so, the remote agents (110) may pre-allocate computing resources in advance of predicted backup loads over time.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4.1-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or a portion of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4.1-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services (in accordance with data protection strategies orchestrated by the remote agents (110)) such as, for example, generating and storing backups in backup storages (120). By storing the backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system.

Backup services may also include assisting the remote agents (110) in generating predictions of future backup loads. The production hosts (130) may assist the remote agents (110) in generating future backup load predictions by providing information regarding the types of assets (e.g., data that will be protected) hosted by the production hosts (130), the types of applications associated with the assets (e.g., the applications that use, generate, and/or maintain the assets), and/or transaction rates of the assets (e.g., how frequently and/or the quantity of data of the assets are changed). By doing so, the remote agents (110) may generate future backup load predictions to reduce their computing resource footprints while providing backup services to the production hosts (130). For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 4.1-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state.

While described above as storing backups of virtual machines, the backup storages (120) may store other types of data from the production hosts (130), or other entities, without departing from the invention. For example, the backup storages (120) may store archives or other data structures from the clients (140) and/or other entities.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to provide the functionality of the remote agents (110) described through this application and all, or a portion, of the methods illustrated in FIGS. 4.1-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) are distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110). The functionality of the remote agents (110) may be provided by other components of the system of FIG. 1 without departing from the invention.

In one or more embodiments of the invention, the remote agents (110) provide data protection services. Data protection services may include (i) generation of backups for the production hosts in accordance with the data protection strategies, (ii) generation of predictions of future backup loads for generating the backups for the production hosts, and (iii) dynamic modification of the computing resource footprint of the remote agents (110) based on the backup load predictions. By doing so, the remote agents (110) may shift computing resources towards the operation of entities that provide application services to the clients (140) while reducing the likelihood of reducing the quality of the data protection services provided to the production hosts (130).

For example, consider a scenario in which the backup load of the production hosts (130) is changing substantially over time. If data protection services are not provided promptly to the production hosts (130), the functionality of the entities, e.g., virtual machines, hosted by the production hosts (130) may be reduced. Consequently, the services provided to the clients (140) may be negatively impacted. To improve the likelihood that data protection services are provided promptly to the production hosts, the remote agents (110) may pre-allocate computing resources, in advance to predicted backup loads, so that the data protection services may be provided during the predicted backup loads. Pre-allocating computing resources may include instantiating and/or terminating dynamic remote agents (114), e.g., instances of virtual machines assigned portions of backup workloads by a master remote agent.

The system of FIG. 1 may include any number of remote agents (e.g., 112, 114.2, 114.4), e.g., there may be multiple master remote agents (e.g., 112) and multiple groups of dynamic remote agents (e.g., 114) associated with corresponding master remote agents. For additional details regarding remote agents (110), refer to FIG. 3.1.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) assist remote agents in generating predictions of future backup loads.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, a backup storage, or another entity, that does not host the applications. In some cases, the application data may be spanned across multiple entities or multiple copies of the application data may be stored in multiple virtual machines to facilitate cooperative action by multiple instance of an application that are hosted by multiple virtual machines. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

The application data hosted by the virtual machines (210) may be the assets. As will be discussed in greater detail below, each of the virtual machines (210) provide information regarding their assets to enable the remote agents to more accurately predict future backup loads. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups. A virtual machine level backup may be a backup that represents the state (or difference from one state to another state) of a virtual machine at a point in time.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agents (230) may orchestrate data protection services including generation of backups, performance of restorations across the system, and/or provide remote access to application data extracted from the backups stored in the backup storages.

In one or more embodiments of the invention, the production agent (230) provides information regarding the generated backups to the remote agents. The remote agents may use such information to provide search services. When such information is provided to the remote agents, a large backup load may be placed on the remote agents. Further, if the remote agents are unable to handle the backup load, the production agent (230) may be required to reduce its backup generation activities to correspond to a rate that the remote agents are able to handle a corresponding backup load.

For example, when the production agent (230) generates a backup, all or a portion of the information in the backup may be provided to the remote agents. Once provided to the remote agents, the remote agents may need to process the information regarding the backup to derive other useful information. If backups are generated by the production agent (230) and/or other production agents of other production hosts at a rate faster than the remote agents are able to processes the information regarding the backups, remote agents may be required to reduce their rate of generating backups. Doing so may have significant, negative consequences. For example, while generating backups, a portion of the computing resources of the example production host (200) are allocated for such activities. Consequently, the virtual machines and hosted applications may have reduced access to computing resources. Additionally, the risk of data loss due to longer durations required for backup generation is increased. Thus, it may be important to reduce the time utilized for generation of backups.

To provide the above noted functionality of the production agent (230), the production agent (230) may perform all, or a portion, of the methods illustrated in FIGS. 4.1-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may include applications (252), a discovery agent (254), and persistent storage (260). Each component of the example virtual machine (250) is discussed below.

As discussed above, the applications (252) may provide application services to clients and/or other entities. The applications (252) may be implemented as computer instructions, e.g., computer code, that when executed by a processor of the example virtual machine (250) gives rise to the functionality of the applications (252).

When providing application services to the clients and/or other entities, the applications (252) may generate application data (262) stored in the persistent storage (260). The application data (262) may include any number of assets. As discussed above, an asset may be a data structure. Each of the assets of the application data (262) may be associated with a corresponding application of the applications (252). For example, a database of the application data (262) may be associated with a database application of the applications (252). The application data (262) may include any number of assets associated with corresponding applications without departing from the invention.

The discovery agent (254) may assist remote agents in obtaining information from the example virtual machine (250) that may be used to predict future backup generation loads. To do so, the discovery agent (254) may (i) identify assets of the application data (262), (ii) obtain information regarding the assets that may be used to generate backup generation load predictions, and/or (iii) generating and provide a virtual machine data package (264) to the remote agents that is based on the information obtained in (i) and (ii). The discovery agent (254) may be instantiated by remote agents to obtain the virtual machine data package (264). The functionality of the discovery agent (254) may be invoked by the remote agents to orchestrate generation of the virtual machine data package (264). For additional information regarding the virtual machine data package (264), refer to FIG. 2.3.

The information regarding the assets may include, for example, the amount of data included in each of the assets, the transaction rate of each of the assets, applications associated with the assets, and/or other information regarding the assets and/or information indicating a rate at which data of the assets changes. The aforementioned information may be obtained by, for example, querying an operating system of the example virtual machine (250) to obtain system metadata regarding the assets and/or sampling the assets. Sampling of the assets may be performed by, for example, monitoring the assets over a period of time and normalizing the data obtained from the monitoring.

Figure 5:
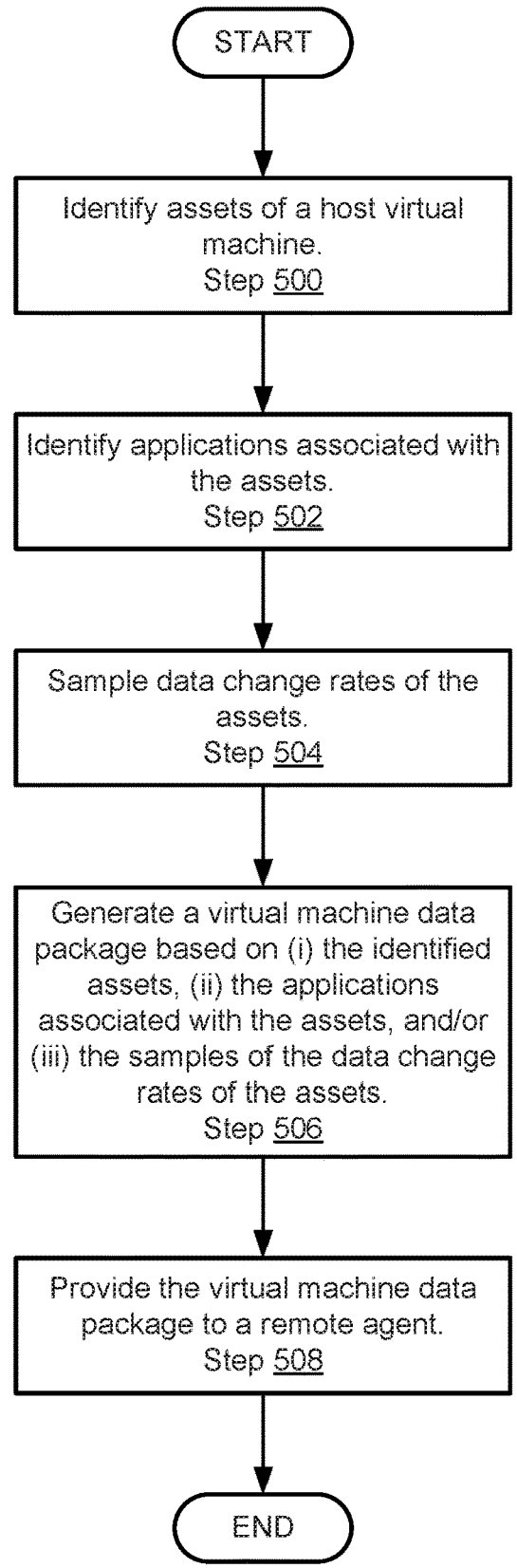
FIG. 5 shows a flowchart of a method of providing a virtual machine data package request in accordance with one or more embodiments of the invention.

To provide the above noted functionality of the discovery agent (254), the discovery agent may perform all, or a portion, of the method illustrated in FIG. 5.

In one or more embodiments of the invention, the discovery agent (254) is implemented as computing code stored on a persistent storage (e.g., 260) that when executed by a processor performs the functionality of the discovery agent (254). The processor may be a hardware processor including circuitry such as, for example, a central processing unit or a microcontroller. The processor may be other types of hardware devices for processing digital information without departing from the invention.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. Such storage resources of the persistent storage (260) may be used to host the application data (262) and the virtual machine data package (264). Each of these data structures is discussed below.

As discussed above, the application data (262) may be a data structure for storing data generated, maintained, and/or used by the applications (252). The application data (262) may be any type of data. The application data (262) may be logically divided into assets. Each of the assets to be associated with one or more of the applications (252). The associations between the assets and the applications (252) may represent that the associated applications (252) use, generate, and/or maintain the assets.

The virtual machine data package (264) may be a data structure that includes information regarding the assets of the example virtual machine (250). For additional details regarding the virtual machine data package (264), refer to FIG. 2.3.

While the example virtual machine (250) of FIG. 2.2 has been described and illustrated as including a limited number of components for the sake of brevity, a virtual machine in accordance with embodiments of the invention may include additional, fewer, and/or different components than those illustrated in FIG. 2.2 without departing from the invention.

As discussed above, a virtual machine data package (264) may be provided to the remote agents by a discovery agent. FIG. 2.3 shows a diagram of an example virtual machine data package (270) in accordance with one or more embodiments of the invention. The example virtual machine data package (270) may be a data structure for storing information regarding assets of a virtual machine.

The example virtual machine data package (270) may include information regarding a quantity of data (272) of the assets, application identifiers (274) that identify applications associated with the assets, and data change rate samples (276) of the assets.

The quantity of data (272) may specify the amount of data in each, or in aggregate, of the asset. Such information may be obtained by querying the operating system of the virtual machine hosting the assets or via other methods.

The application identifiers (274) may be identifiers of applications associated with each of the assets of a virtual machine. Such information may be obtained by querying the operating system of the virtual machine hosting the assets or via other methods.

The data change rate samples (276) may include rate of change data of the assets. The data change rate samples (276) may be obtained by monitoring the assets over a predetermined period of time to identify any number of changes made to the assets during the predetermined period of time. The data change rate samples (276) may then be determined by dividing the changes made to each of the assets by the predetermined amount of time.

While the example virtual machine data package (270) of FIG. 2.3 has been described as including a limited amount of specific information, the example virtual machine data package (270) may include additional, different, and/or less information without departing from the invention. Additionally, the example virtual machine data package (270) may be divided into any number of separate data structures and/or may be integrated into another data structure without departing from the invention.

As discussed above, remote agents may provide data protection services. FIG. 3.1 shows a diagram of an example remote agent (300) in accordance with one or more embodiments of the invention. The example remote agent (300) may include a backup manager (310) and persistent storage (320). Each of these components of the example remote agent (300) is discussed below.

The backup manager (310) may (i) obtain virtual machine data packages (326) from virtual machines for which the example remote agent (300) will provide data protection services, (ii) generate backup generation workload predictions using the virtual machine data packages (326) and lifecycle policies (322), (iii) generate a resource allocation calendar (324) based on the backup generation workload predictions, (iv) dynamically modify the computing resource footprint of the example remote agent (300) based on the resource allocation calendar (324), (v) orchestrate the generation and storage of backups of the virtual machines in backup storages based on the lifecycle policies (322), and (vi) process information regarding the generated backups to obtain a backup data catalog (328). By doing so, the example remote agent (300) may dynamically modify its computing resource footprint to provide data protection services to production hosts. For additional details regarding the resource allocation calendar (324), refer to FIG. 3.2.

To obtain the virtual machine data packages (326), the backup manager (310) may instantiate discovery agents in the virtual machines, generate the virtual machine data packages (326) using the discovery agents, and store the virtual machine data packages (326) in the persistent storage (320). As discussed above, the virtual machine data packages (326) may include information regarding the virtual machines that may assist the backup manager (310) in predicting future backup generation workloads.

To provide the above noted functionality of the backup manager (310), the backup manager (310) may perform all, or a portion, of the methods illustrated in FIGS. 4.1-5.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a physical storage. The physical storage may include any combination of hard disk drives, solid state disk drives, tape drives, and/or any other physical storage mediums for the storage of data.

In one or more embodiments of the invention, the persistent storage (320) is a logical storage (e.g., virtualized storage) that utilizes any quantity of hardware storage resources of any number of computing devices for storing data. For example, the persistent storage (320) may utilize portions of any combination of hard disk drives, solid state disk drives, tape drives, and/or any other physical storage medium of any number of computing devices. The persistent storage (320) may store the lifecycle policies (322), the resource allocation calendar (324), the virtual machine data packages (326), and a backup data catalog (328).

The lifecycle policies (322) may be a data structure that includes information regarding data protection strategies. The data protection strategies may specify (i) when backups for each virtual machine of any number of virtual machines are to be generated, (ii) where the generated backups are to be stored, (iii) how many copies of the backup are to be stored, and/or (iv) other characteristics of the data protection strategies to be employed for any number of virtual machines.

For example, one of the lifecycle policies (322) may specify that a backup for a virtual machine is to be generated every 12 hours and that the generated backup is to be stored in a particular backup storage. Different lifecycle policies (322) may define different data protection strategies for different virtual machines. There may be any number of lifecycle policies (322) for any number of virtual machines and/or groups of virtual machines (or other entities) without departing from the invention.

The resource allocation calendar (324) may be a data structure that includes information regarding the computational footprint of the remote agents over time. For example, the resource allocation calendar (324) may specify the number of master and dynamic remote agents that are to be operating at any point in time. For additional details regarding the resource allocation calendar (324), refer to FIG. 3.2.

The virtual machine data packages (326) may be data structures that include information regarding the assets of the virtual machines. There may be any number of virtual machine data packages (e.g., 326.2, 326.4) in the persistent storage (320). The virtual machine data packages (326) may be obtained from corresponding virtual machines. The virtual machine data packages (326) may be deleted and/or retained once information from the respective virtual machine data packages (326) is used to generate and/or update the resource allocation calendar (324). In some cases, only the virtual machine data packages (326) are in the persistent storage (320). In other words, the resource allocation calendar (324) may not be generated and the virtual machine data packages (326) may be utilized in place of the resource allocation calendar (324).

In some cases, multiple virtual machine data packages may be obtained from a virtual machine. The multiple virtual machine data packages may be obtained at different points in time. For example, as the applications hosted by a virtual machine change, additional virtual machine data packages for the virtual machine may need to be generated to accurately reflect the assets included in the virtual machine after the applications hosted by the virtual machine change. Thus, as the state of the virtual machine changes, new virtual machine data packages may be generated and sent to the example remote agent (300). The resource allocation calendar (324) may be updated to reflect the new virtual machine data packages.

The backup data catalog (328) may include information derived from information regarding backups generated by the production hosts. For example, the backup data catalog (328) may include information regarding backups stored in backup storages. To minimize the storage foot print of the backups in the backup storages, the backups may be stored in a format that does not provide for easy indexing and/or searching. The information included in the backup data catalog (328) may provide indexing and/or searching functionality for the backups in the backup storages. The information included in the backup data catalog (328) may be other types of information without departing from the invention.

While the example remote agent (300) of FIG. 3.1 has been described and illustrated as including a limited number of components for the sake of brevity, a remote agent in accordance with embodiments of the invention may include additional, fewer, and/or different components than those illustrated in FIG. 3.1 without departing from the invention.

As discussed above, a resource allocation calendar may be used to dynamically adjust the computational footprint of the remote agents. FIG. 3.2 shows a diagram of an example resource allocation calendar (350) in accordance with one or more embodiments of the invention. The example resource allocation calendar (350) may be a data structure for storing information regarding the allocation of resources for remote agents.

The example resource allocation calendar (350) may include any number of entries (e.g., 352, 360) for storing information regarding an allocation of resources during a corresponding period of time. Each of the entries (e.g., 352, 360) may include a period of time identifier (354) and a resource allocation map (356).

The period of time identifier (354) may be information used to identify a period of time associated with an entry (e.g., 352). The period of time identifier (354) may be, for example, two descriptions that each specify the start of the period of time or the end of the period of time of the entry.

The resource allocation map (356) may be information that specifies a computational footprint of the remote agents during a period of time specified by the associated period of time identifier (354). For example, the resource allocation map (356) may specify an (i) identity of a master remote agent tasked with provided data protection services for a group of virtual machines and (ii) a number of dynamic remote agents that are to assist the master remote agent in providing the backup services. The resource allocation map (356) may include such information for any number of master remote agents that are each associated with any number of virtual machines for providing data protection services.

The resource allocation map (356) may specify the computational footprint of the remote agents in other manners without departing from the invention. For example, the resource allocation map (356) may specify a quantity of processing resources, memory resources, storage resource, etc. to be allocated to the remote agents during a predetermined period of time.

While an example resource allocation calendar (350) has been described as including a limited amount of specific information, the example resource allocation calendar (350) may include additional, different, and/or less information without departing from the invention. Additionally, while described as a list of entries (e.g., 352, 560), the example resource allocation calendar (350) may have a different organizational structure, other than a list, without departing from the invention. Further, the example resource allocation calendar (350) may be divided into any number of separate data structures and/or may be integrated into another data structure without departing from the invention.

Returning to FIG. 1, the remote agents (110) may provide data protection services to the production hosts (130) and/or other entities. FIGS. 4.1-4.2 illustrate methods that may be performed by the remote agents of the system of FIG. 1 when providing data protection services.

FIG. 4.1 shows a flowchart of a method in accordance with one or more embodiments of the invention. The method depicted in FIG. 4.1 may be used to update a resource allocation calendar in accordance with one or more embodiments of the invention. The method shown in FIG. 4.1 may be performed by, for example, remote agents (e.g., 110, FIG. 1). Other components of the system illustrated in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a virtual machine data package is obtained. The virtual machine data package may be associated with the virtual machine for which data protection services are provided. Data protection services may be being provided to any number of virtual machines.

The virtual machine data package may include, for example, identifiers of assets of the virtual machine, identifiers of applications associated with the assets, and data change rate samples of each of the assets. The virtual machine data package may be generated by a discovery agent.

The discovery agent may be instantiated in the virtual machine by a remote agent. For example, discovery agent may be instantiated by the remote agent when the virtual machine starts to obtain data protection services from the remote agent.

In step 402, lifecycle policies associated with the virtual machines for which data protection services are being provided are obtained.

In one or more embodiments of the invention, lifecycle policies are stored in persistent storage of the remote agent or persistent storage that is otherwise accessible by the remote agent. The lifecycle policies may specify when backups are to be generated for each of the virtual machines.

In step 404, a computational load change point is identified based on the lifecycle policies and the magnitude of the computational loads during periods of time demarcated by the computational load change point are identified.

In one or more embodiments of the invention, the computational load change point is a point in time specified by the lifecycle policies when a backup is to be generated for one of the virtual machines. For example, the one of the virtual machines may be the virtual machine of step 400.

Any number of computational load change points may be identified by analyzing the lifecycle policies. By doing so, a schedule of future computational load change points may be obtained.

For example, a first lifecycle policy may specify that a backup is to be generated at 1 PM every day. A second lifecycle policy may specify that a second backup is to be generated at 3 PM every day. In this scenario, 1 PM and 3 PM of each day may be identified as computational load change points.

In one or more embodiments of the invention, the computational loads during the periods of time demarcated by the computational load change point are identified based using virtual machine data packages and the lifecycle policies. For example, during each of the periods of time, the backups that are scheduled for generation during the periods of time may be identified.

The magnitude of the computational load for generating each of the identified backups may be identified using the virtual machine data packages. For example, the quantity of data of each asset, the transaction rate of each asset, and the applications associated with each asset may be used to predict how much of the data of the asset will change prior to each backup. The estimated amount of the data of each asset that is predicted to change prior to each backup may be summed to estimate the total quantity of data that will need to be processed by the remote agents. The magnitude of the computational load during each of the periods of time demarcated by the load points may be identified by estimating the computational resources, i.e., number of instances of dynamic remote agents, required to processes the total quantity of data that will need to be processed by the remote agents during each time period.

The aforementioned processes may be repeated for any number of time periods demarcated by any number of computational load change points to obtain computational loads estimates associated with any number of time periods.

In step 406, a resource allocation calendar is updated based on the identified computational load change points and the magnitudes of the computational loads during the periods of time.

As discussed above, the computational load change points may demarcate any number of time periods. Each of the time periods may be associated with a corresponding computational load, as discussed with respect to Step 404. The resource allocation calendar may be updated to reflect the time periods and corresponding resources necessary to meet each of the computational loads.

For example, the updated resource allocation calendar may specify any number of time periods and corresponding numbers of dynamic remote agents that should be operating during each of the respective time periods.

In one or more embodiments of the invention, each of the time periods of the updated resource allocation calendar is extended earlier in time by a predetermined amount of time. The predetermined amount of time may be proportional to the number of dynamic remote agents specified for each time period. By doing so, a buffer for each time period may be provided so that the dynamic remote agents will be instantiated just prior to each time period and may be fully operational at the start of each time period.

When the resource allocation calendar is updated, each period of time specified by the resource allocation calendar may have an associated resource allocation. The associated resource allocation may be, for example, the number of dynamic remote agents that will be instantiated just prior to each respective time period.

The method may end following Step 406.

As discussed above, a resource allocation calendar may be used to schedule resource allocations for backup generation and processing purposes. FIG. 4.2 shows a flowchart of a method in accordance with one or more embodiments of the invention. The method depicted in FIG. 4.2 may be used to generate a backup in accordance with one or more embodiments of the invention. The method shown in FIG. 4.2 may be performed by, for example, remote agents (e.g., 110, FIG. 1). Other components of the system illustrated in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, a new time period specified by resource allocation calendar is identified. As discussed above, resource allocation calendar may specify different periods of time. The new period of time may be identified when prior period of time comes to an end.

In step 412, a resource allocation associated with the new time period is identified.

In one or more embodiments of the invention, the resource allocation is identified using the resource allocation calendar. As discussed above, the resource allocation calendar may specify a resource allocation for each period of time.

In Step 414, an existing resource allocation is updated based on the resource allocation. The resource allocation may be updated by instantiating new remote agents or terminating existing remote agents to modify the existing resource allocation to match the resource allocation. Any number of master and/or dynamic remote agents may be instantiated and/or terminated during the update.

In step 416, a backup generation event is identified during the new time period.

In one or more embodiments of the invention, the backup generation event is identified using the lifecycle policies. For example, lifecycle policies may specify that a backup is to be generated in response to the backup generation event. The backup generation event may be, for example, the occurrence of a particular point in time. The backup generation event may be other types of events without departing from the invention.

In step 418, a backup is generated using the updated resource allocation in response to the backup generation event.

In one or more embodiments of the invention, the backup is generated for a virtual machine implicated by the lifecycle policy that was triggered by the backup generation event of Step 416. The backup may be generated by instructing a production host that hosts the virtual machine to generate the backup. Information may be streamed to one or more remote agents (e.g., a dynamic remote agent of the updated resource allocation tasked with managing the streamed information). The remote agents may use the streamed information to update a backup data catalog. Updating the backup data catalog may add information regarding the backup to the backup data catalog. By doing so, the data of the backup may be searched using the information included in the backup data catalog (328, FIG. 3).

The method may end following Step 416.

As discussed above, discovery agents may be used to obtain a virtual machine data package for data protection purposes. FIG. 5 shows a flowchart of a method in accordance with one or more embodiments of the invention. The method depicted in FIG. 5 may be used to obtain a virtual machine data package in accordance with one or more embodiments of the invention. The method shown in FIG. 5 may be performed by, for example, production hosts (e.g., 130, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, assets of a host virtual machine are identified.

In one or more embodiments of the invention, the assets of the host virtual machine are data structures associated with applications hosted by the host virtual machine. The assets of the host virtual machine may be identified by crawling the persistent storage of the virtual machine. When crawling the persistent storage of the virtual machine, identified portions of data stored in the persistent storage may be compared to a list of asset types. The list of asset types may specify characteristics of each of the assets that may be used to identify the assets. For example, the list of asset types may include identifiers of different types of assets.

In one or more embodiments of the invention, the host virtual machine is a virtual machine that hosts a discovery agent that is identifying the assets of the host virtual machine. The host virtual machine may be a different virtual machine from the virtual machine that hosts the discovery agent without departing from the invention.

In step 502, applications associated with the assets are identified.

In one or more embodiments of the invention, the applications are associated with the assets based on the applications' use of the assets, maintenance of the assets, and/or generation of the assets. The associations may be based on other relationships without departing from the invention.

In step 504, data change rates of the assets are sampled.

In one or more embodiments of the invention, the data change rate of an asset is sampled by monitoring the changes to data of an asset over a predetermined period of time. The data change rate may be determined by dividing the changes by the predetermined period of time.

In step 506, a virtual machine data package is generated based on (i) the identified assets, (ii) the applications associated with the assets, and/or (iii) the samples of the data change rates of the assets.

In one or more embodiments of the invention, virtual machine data package is a data structure that includes information regarding (i) the identified assets, (ii) the applications associated with the assets, and/or (iii) the samples of the data change rates of the assets. The virtual machine data package may include additional, less, and/or different information that may be used to predict future backup loads without departing from the invention.

In step 508, the virtual machine data package is provided to a remote agent.

In one or more embodiments of the invention, the virtual machine data package is provided to the remote agent by sending a copy of the virtual machine data package to the remote agent.

In one or more embodiments of the invention, the virtual machine data package is provided to the remote agent by making the virtual machine data package accessible to the remote agents. For example, the virtual machine data package may be made accessible by providing remote access to the remote agent.

The method may end following step 508.

The method of FIG. 5 may be invoked by the remote agent. For example, the remote agent may send instructions to a discovery agent hosted by a virtual machine to perform the method. The remote agent may send such instructions at different points in time. For example, instructions may be sent to the discovery agent when the virtual machine is initially designed as an entity for which a remote agent will provide data protection services. In another example, instructions may be sent to the discovery agent after a period of time has elapsed from when the instructions were previously sent. By doing so, an updated virtual machine data package may be obtained.

In a still further example, the instructions may be sent to the discovery agent in response to a predetermined event. The predetermined event may be when a predicted backup load diverges from an actual backup load. Such an event may indicate that an updated virtual machine data package should be obtained to improve the accuracy of predictions by the remote agents.

To further clarify embodiments of the invention, a non-limiting example is provided in FIGS. 6.1-6.7. Each of these figures may illustrate a system similar to that illustrated in FIG. 1 at different points in times and/or data structures utilized by the example system. For the sake of brevity, only a limited number of components of the system of FIG. 1 are illustrated in each of FIGS. 6.1-6.7.

EXAMPLE

Consider a scenario as illustrated in FIG. 6.1 in which a master remote agent (600) is to start providing data protection services to production host (610). The production host (610) hosts a first virtual machine (612), a second virtual machine (620), and a third virtual machine (622). Each of these virtual machines hosts host an email application (not shown) and a database application (not shown). When operating, the email application hosted by each of the virtual machines generates email application data (614) and the database application generates database application data (616).

Lifecycle policies (not shown) associated with these applications specify that backups are to be dynamically generated for the email application data (614) and backups for the database application data (616) are to be generated between 11 PM to 12 AM each night. To generate backups dynamically for the email application data (614), lifecycle policies specify that a backup is to be generated whenever the email application data (614) includes 1 gigabyte of changes, e.g., new data, modifications of old data, removal of data, etc.

To provide data protection services for the production host (610), the master remote agent (600) instantiates a discovery agent (618) in the first virtual machine (612). Once instantiated, the master remote agent (600) instructs the discovery agent (618) to provide a virtual machine data package.

In response to the instructions from the master remote agent (600), the discovery agent (618) identifies email application data (614) and the database application data (616) as assets. The discovery agent (618) identifies that these assets are associated with the email application and the database application. Additionally, the discovery agent (618) samples change rates to these assets over different periods of time. From the sampling, the discovery agent (618) identifies that the email application data (614) is a very high data change rate between 10 AM to 12 PM daily and that the database application data (616) has an even higher change rate over the course of each day resulting in a very large quantity of data that will need to be processed for data protection purposes each day.

Using the aforementioned discovered information, the discovery agent (618) generates a virtual machine data package and sends a copy of the virtual machine data package to the master remote agent (600).

In response to receiving the virtual machine data package, the master remote agent (600) generates a resource allocation calendar (602). The resource allocation calendar (602) is generated by making predictions of backup loads during different periods of time, as discussed with respect to FIG. 4.1.

FIG. 6.2 shows a diagram of resource allocation calendar (602). As seen from the diagram of the resource allocation calendar (602), the resource allocation calendar (602) specifies different resource allocations associated with different periods of time. A first period of time from 10 AM to 12 PM is associated with a resource allocation of 2 dynamic remote agents. A second period of time from 12 PM to 11 PM is associated with a resource allocation of zero dynamic remote agents. A third period of time from 11 PM to 12 AM is associated with a resource allocation of 3 dynamic remote agents. A fourth period of time from 12 AM to 10 AM is associated with a resource allocation of zero dynamic remote agents.

After establishing the resource allocation calendar (602), the master remote agent (600) begins providing data protection services using the resource allocation calendar (602).

At the start of the first day, no dynamic remote agents are instantiated as shown in FIG. 6.1. No dynamic remote agents are instantiated because the resource allocation starting at 12 AM specifies that zero dynamic remote agents are to be operating.

As the day progresses, the master remote agent (600) instantiates a first dynamic remote agent (604) and a second dynamic remote agent (606) at 10 AM as seen in FIG. 6.3. The master remote agent (600) instantiates these dynamic remote agents because the period of time specified in the resource allocation calendar starting at 10 AM specifies a resource allocation that includes 2 dynamic remote agents. After instantiation, the master remote agent (600) distributes the backup workload to these remote agents. By doing so, the instantiated dynamic remote agents are able to appropriately process the backup workload caused by the very high data change rate of the email application data (614) starting at 10 AM.

As the day further progresses, the master remote agent (600) terminates the dynamic remote agents at 12 PM as seen in FIG. 6.4. The master remote agent (600) terminates these dynamic remote agents because the period of time specified in the resource allocation calendar starting at 12 PM specifies a resource allocation that includes zero dynamic remote agents. The master remote agent (600) provides data protection services starting at 12 PM without assistance from dynamic remote agents. However, the master remote agent (600) has difficulty keeping up with a backup workload caused by the email application data (614). Starting at 12 PM, the email application data (614) had a higher change rate than was predicted resulting in a larger number of backup generations being performed to meet the requirements of the lifecycle policies. Consequently, the operation of the virtual machines (612, 620, 622) was negatively impacted because the master remote agent (600), alone, was unable to processes information regarding the backups sufficiently quickly to keep up with the generated backups.

When the day progressed to 11 PM, the master remote agent (600) instantiates the first dynamic remote agent (604), the second dynamic remote agent (606), and a third dynamic remote agent (608) as seen in FIG. 6.5. The master remote agent (600) instantiates these dynamic remote agents because the period of time specified in the resource allocation calendar starting at 11 PM specifies a resource allocation that includes 3 dynamic remote agents. After instantiation, the master remote agent (600) distributes the backup workload to these remote agents. By doing so, the instantiated dynamic remote agents (604,606, 608) are able to appropriately process the backup workload caused by the database application data (616) starting at 11 PM when, to comply with the lifecycle policies, backups of the database application data (616) are generated.

At the end of the day, the master remote agent (600) instructs the discovery agent (618) to provide a second virtual machine data package. The master remote agent (600) provides these instructions to the discovery agent (618) because it determined that providing of data protection services from 12 PM to 11 PM negatively impacted the operation of the virtual machines (612, 6210, 622).

In response to receiving the instructions, the discovery agent (618) generates a second virtual machine data package and provides the master remote agent (600) with the second virtual machine data package. In contrast to the first virtual machine data package, the second virtual machine data package includes a data change rate sample that indicates a moderate number of backups made to be generated from 12 PM to 11 PM.

In response to obtaining the second virtual machine data package, the master remote agent (600) updates the resource allocation calendar (602) as illustrated in FIG. 6.6. As seen from FIG. 6.6, the resource allocation calendar (602) specifies that from 12 PM to 11 PM, a resource allocation of 1 dynamic remote agent is to be used. Consequently, from 12 PM to 11 PM on the following day, the master remote agent (600) instantiates the first dynamic remote agent (604) as illustrated in FIG. 6.7.

End of Example

As shown in the above example, a system in accordance with embodiments of the invention may dynamically allocate resources for data protection services. For example, any number of dynamic remote agents may be instantiated and/or terminated. By doing so, the system may more efficiently marshal limited computing resources to provide services to clients while also providing data protection services internally resulting in an improved likelihood of the survival of data for future use.

Figure 7:
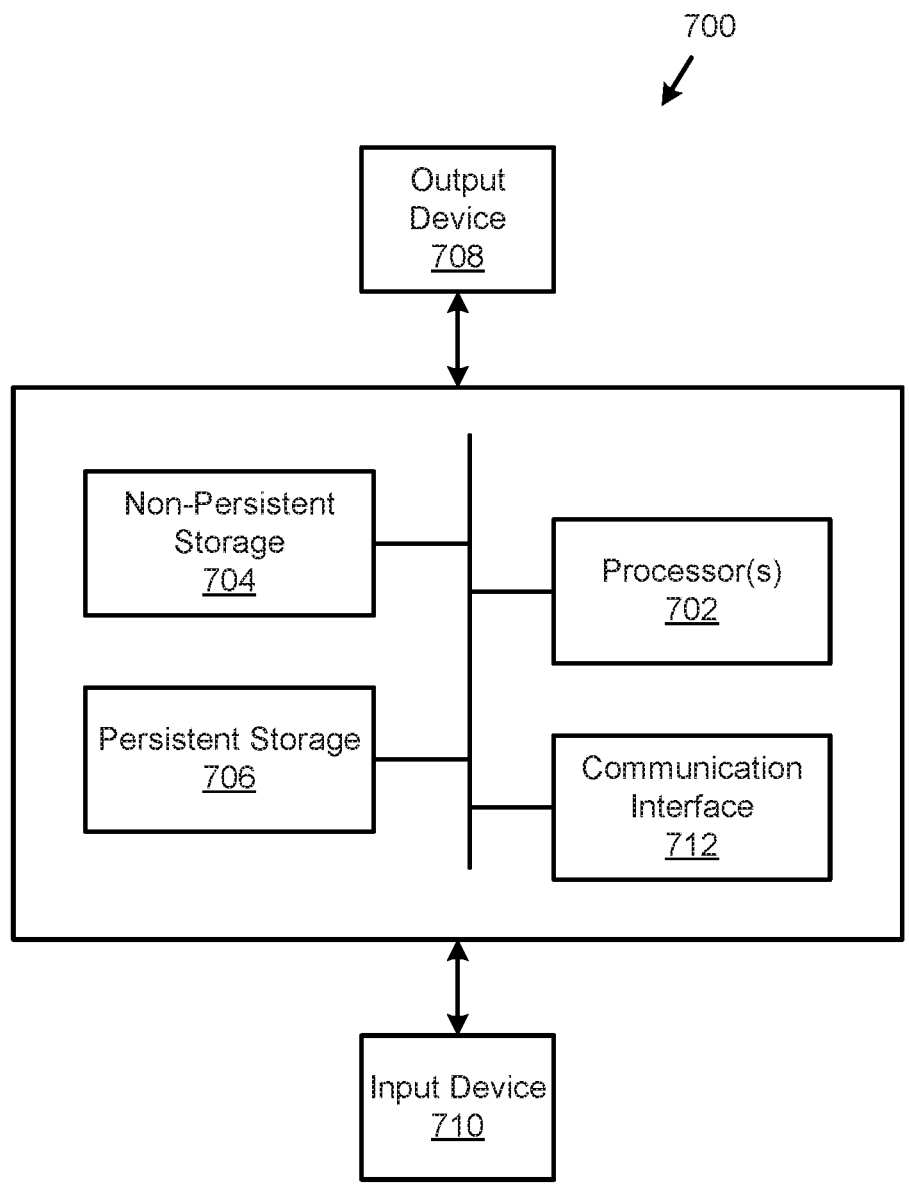
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide the method for managing the limited computing resources of a distributed system for data protection services. For example, embodiments of the invention may provide an architecture for dynamically allocating resources in a distributed system. The system may dynamically allocate resources based on predictions of future backup workloads that will be performed to meet lifecycle policy requirements. By doing so, the system may more efficiently marshal limited computing resources to provide services to clients while complying with data protection strategies.

Thus, embodiments of the invention may address the problem of the limited availability of computational resources in a distributed system that relies on data redundancy for data protection purposes. Specifically, embodiments of the invention may provide a method of dynamically allocating resources of a distributed system based on predicted future backup workloads.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for providing data protection services to virtual machines, comprising:
persistent storage for storing a resource allocation calendar and lifecycle policies associated with the virtual machines;
a hardware processor; and
a backup manager executing on the hardware processor, and programmed to:
obtain a virtual machine data package from a virtual machine of the virtual machines;
identify a computational load change point based on the lifecycle policies;
predict a magnitude of a computational load during a period of time demarcated by the computational load change point using, at least in part, the virtual machine data package;
update the resource allocation calendar to obtain an updated resource allocation calendar, wherein the updating is based on:
the identified computational load change point, and
the magnitude of the computational load during the period of time; and
generate a backup for the virtual machine using the updated resource allocation calendar.

2. The remote agent of claim 1, wherein generating the backup for the virtual machine using the updated resource allocation calendar comprises:
identifying a new time period specified by the updated resource allocation calendar;
identifying a resource allocation associated with the new time period;
updating an existing resource allocation based on the resource allocation;
identifying a backup generation event during the new time period; and
generating a backup in response to the backup generation event using the updated existing resource allocation.

3. The remote agent of claim 2, wherein the existing resource allocation is updated based on the resource allocation by:
instantiating a dynamic remote agent that utilizes computing resources separate from second computing resources of the remote agent when the resource allocation associated with the new time period is larger than a second resource allocation associated with a previous time period; and
terminating a second remote agent that utilizes third computing resources separate from the second computing resources of the remote agent when the resource allocation associated with the new time period is smaller than a third resource allocation associated with a second previous time period.

4. The remote agent of claim 3, wherein the dynamic remote agent is instantiated prior to the backup generation event.

5. The remote agent of claim 2, wherein generating the backup using the updated resource allocation calendar in response to the backup generation event comprises:
assigning a dynamic virtual machine instantiated when the existing resource allocation is updated to process metadata associated with the backup.

6. The remote agent of claim 5, wherein processing the metadata associated with the backup enables the backup to be searched.

7. The remote agent of claim 1, wherein the backup manager is further programmed to:
prior to obtaining the virtual machine data package:
instantiate a discovery agent in the virtual machine;

identify, using the discovery agent, assets of the virtual machine;
identify, using the discovery agent, applications associated with the assets;
sample, using the discovery agent, data change rates of the assets; and
generate the virtual machine data package based on at least the:
assets,
applications, and
samples of the data change rates.

8. A method for a remote agent to provide data protection services to virtual machines, comprising:
obtaining a virtual machine data package from a virtual machine of the virtual machines;
identifying a computational load change point based on lifecycle policies associated with the virtual machines;
predicting a magnitude of a computational load during a period of time demarcated by the computational load change point using, at least in part, the virtual machine data package;
updating a resource allocation calendar to obtain an updated resource allocation calendar, wherein the updating is based on:
the identified computational load change point, and
the magnitude of the computational load during the period of time; and
generating a backup for the virtual machine using the updated resource allocation calendar.

9. The method of claim 8, wherein generating the backup for the virtual machine using the updated resource allocation calendar comprises:
identifying a new time period specified by the updated resource allocation calendar;
identifying a resource allocation associated with the new time period;
updating an existing resource allocation based on the resource allocation;
identifying a backup generation event during the new time period; and
generating a backup in response to the backup generation event using the updated existing resource allocation.

10. The method of claim 9, wherein the existing resource allocation is updated based on the resource allocation by:
instantiating a dynamic remote agent that utilizes computing resources separate from second computing resources of the remote agent when the resource allocation associated with the new time period is larger than a second resource allocation associated with a previous time period; and
terminating a second remote agent that utilizes third computing resources separate from the second computing resources of the remote agent when the resource allocation associated with the new time period is smaller than a third resource allocation associated with a second previous time period.

11. The method of claim 10, wherein the dynamic remote agent is instantiated prior to the backup generation event.

12. The method of claim 9, wherein generating the backup using the updated resource allocation calendar in response to the backup generation event comprises:
assigning a dynamic virtual machine instantiated when the existing resource allocation is updated to process metadata associated with the backup.

13. The method of claim 12, wherein processing the metadata associated with the backup enables the backup to be searched.

14. The method of claim 8, further comprising:
prior to obtaining the virtual machine data package:
instantiating a discovery agent in the virtual machine;
identifying, using the discovery agent, assets of the virtual machine;
identifying, using the discovery agent, applications associated with the assets;
sampling, using the discovery agent, data change rates of the assets; and
generating the virtual machine data package based on at least the:
assets,
applications, and
samples of the data change rates.

15. A non-transitory computer readable medium comprising computer readable program code, which when executed by a computer processor enables the computer processor to perform a method for method for a remote agent to provide data protection services to virtual machines, the method comprising:
obtaining a virtual machine data package from a virtual machine of the virtual machines;
identifying a computational load change point based on lifecycle policies associated with the virtual machines;
predicting a magnitude of a computational load during a period of time demarcated by the computational load change point using, at least in part, the virtual machine data package;
updating a resource allocation calendar to obtain an updated resource allocation calendar wherein the updating is based on:
the identified computational load change point, and
the magnitude of the computational load during the period of time; and
generating a backup for the virtual machine using the updated resource allocation calendar.

16. The non-transitory computer readable medium of claim 15, wherein generating the backup for the virtual machine using the updated resource allocation calendar comprises:
identifying a new time period specified by the updated resource allocation calendar;
identifying a resource allocation associated with the new time period;
updating an existing resource allocation based on the resource allocation;
identifying a backup generation event during the new time period; and
generating a backup in response to the backup generation event using the updated existing resource allocation.

17. The non-transitory computer readable medium of claim 16, wherein the existing resource allocation is updated based on the resource allocation by:
instantiating a dynamic remote agent that utilizes computing resources separate from second computing resources of the remote agent when the resource allocation associated with the new time period is larger than a second resource allocation associated with a previous time period; and
terminating a second remote agent that utilizes third computing resources separate from the second computing resources of the remote agent when the resource allocation associated with the new time period is smaller than a third resource allocation associated with a second previous time period.

18. The non-transitory computer readable medium of claim 17, wherein the dynamic remote agent is instantiated prior to the backup generation event.

19. The non-transitory computer readable medium of claim 16, wherein generating the backup using the updated resource allocation calendar in response to the backup generation event comprises:
assigning a dynamic virtual machine instantiated when the existing resource allocation is updated to process metadata associated with the backup.

20. The non-transitory computer readable medium of claim 19, wherein processing the metadata associated with the backup enables the backup to be searched.

\* \* \* \* \*